Figure 1:
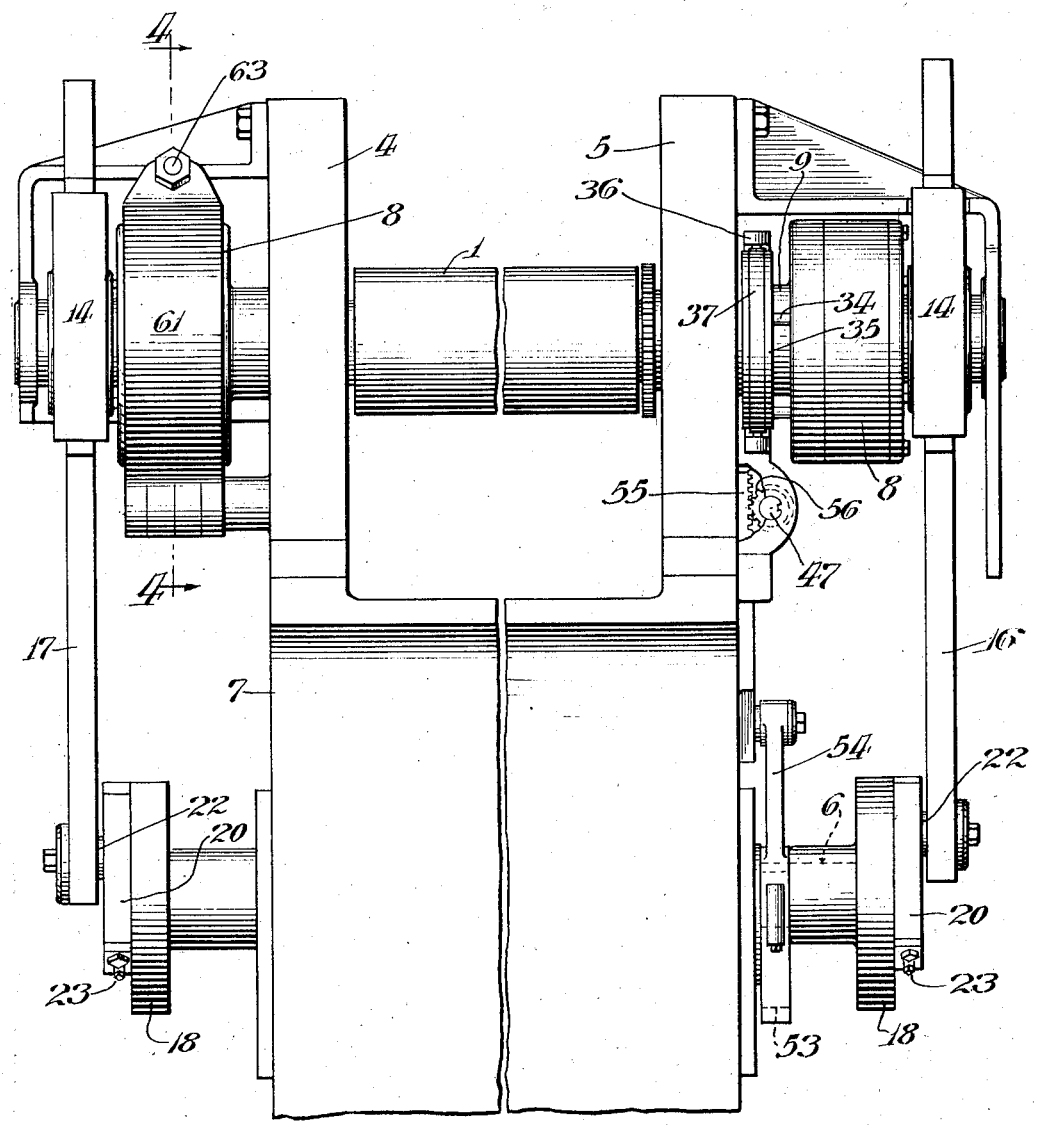

May 16, 1933.  W. E. JENSEN  1,909,831
MULTIPLE CLUTCH DRIVE
Filed Aug. 19, 1931  6 Sheets-Sheet 1

Inventor:
Walter E. Jensen,
By Wm. F. Freudenreich,
Attorney

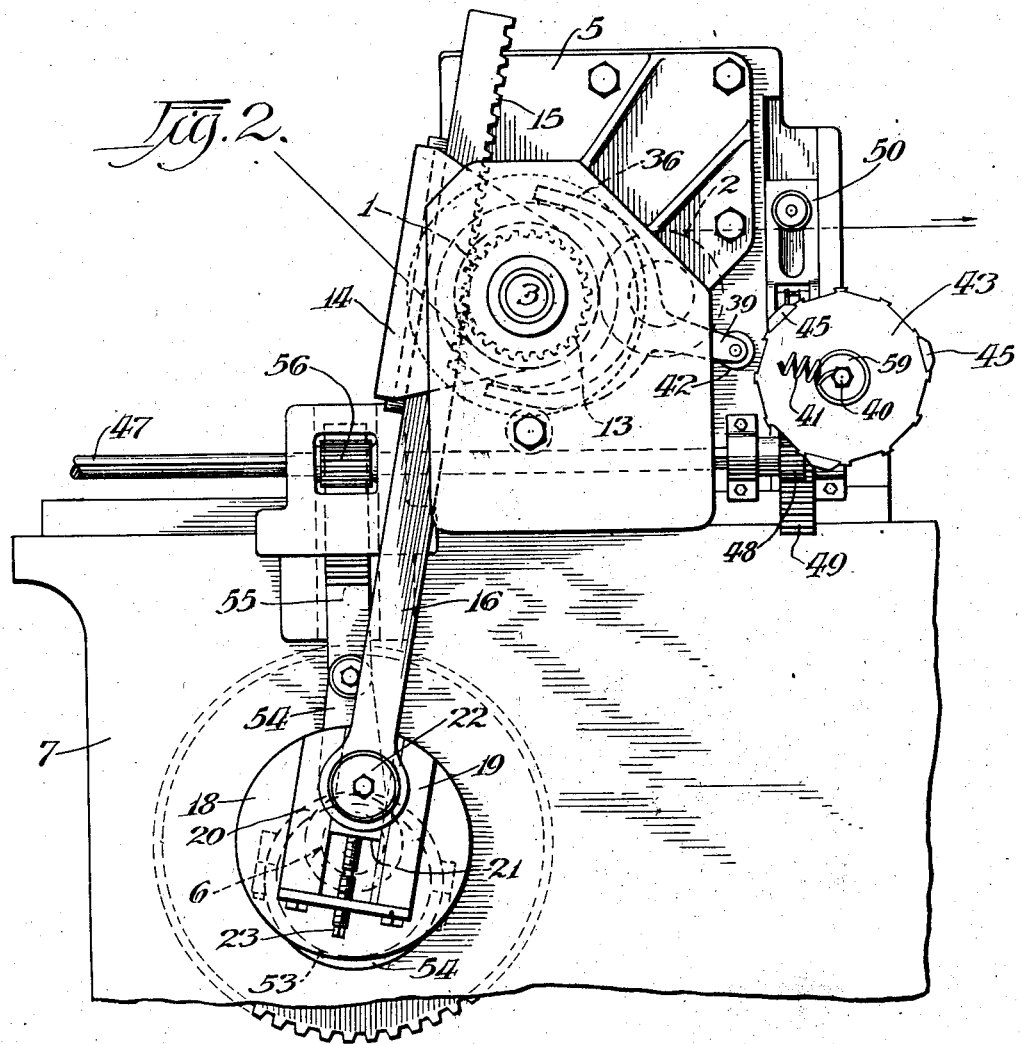

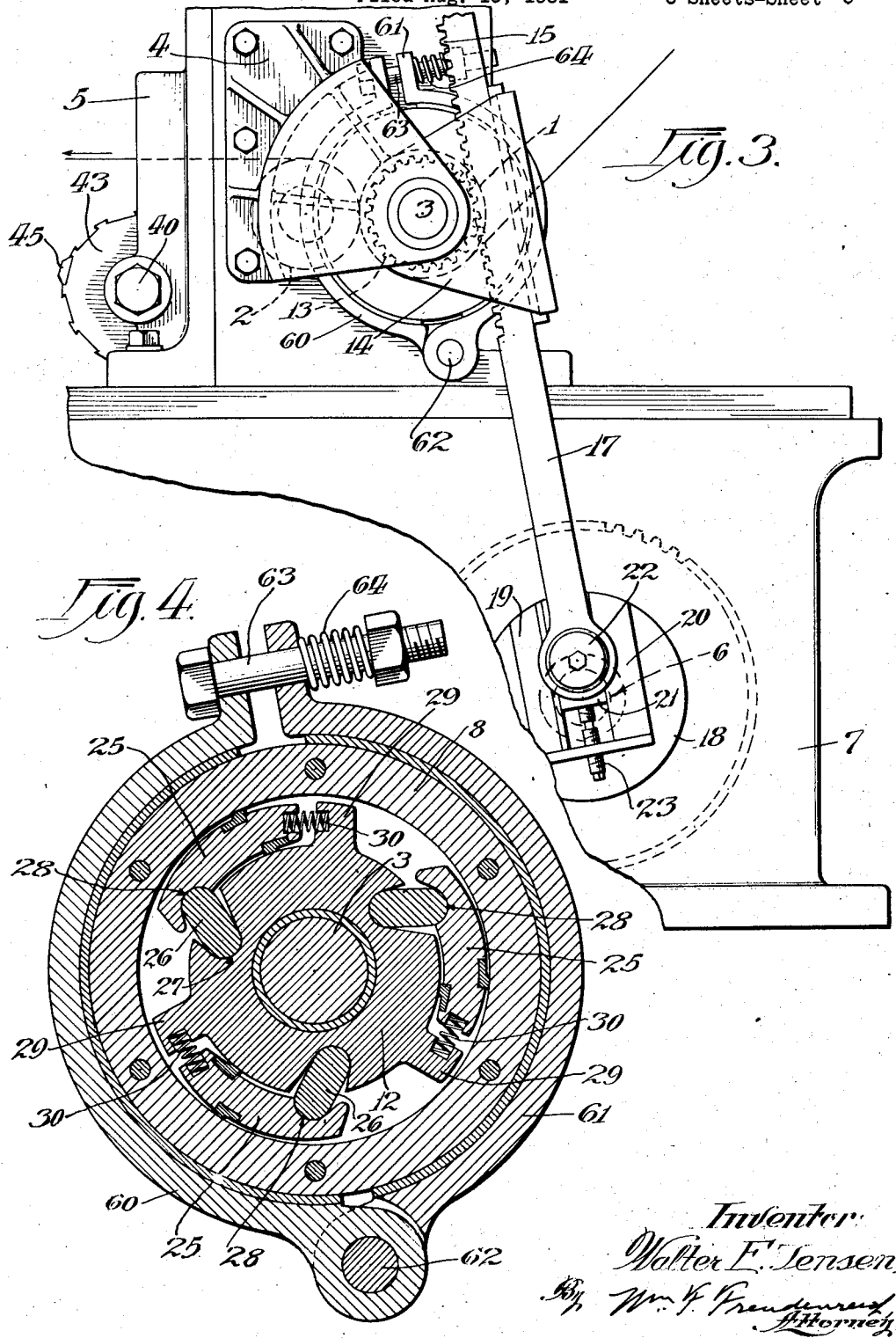

May 16, 1933.   W. E. JENSEN   1,909,831
MULTIPLE CLUTCH DRIVE
Filed Aug. 19, 1931   6 Sheets-Sheet 4
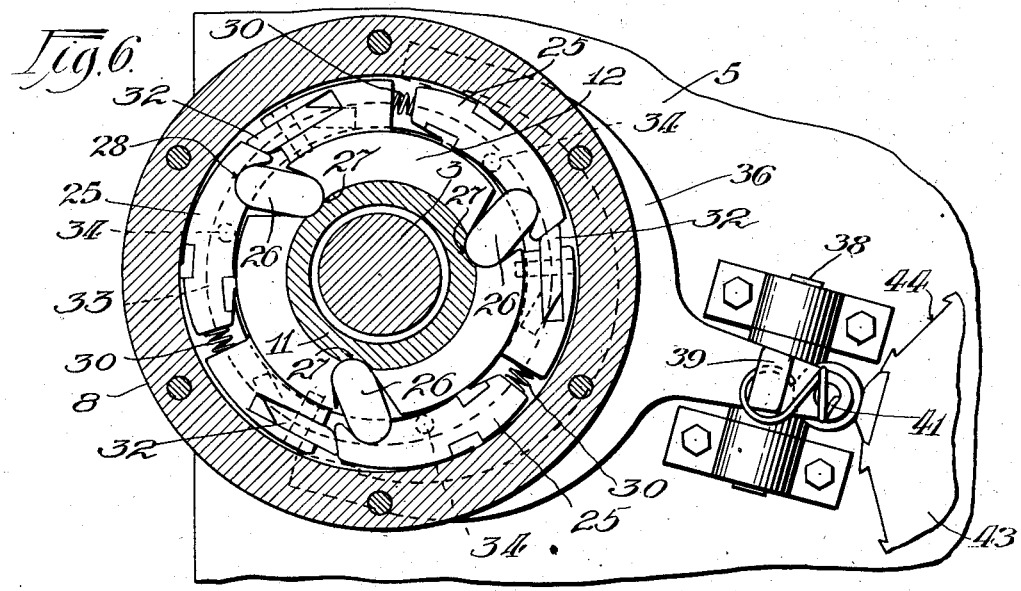
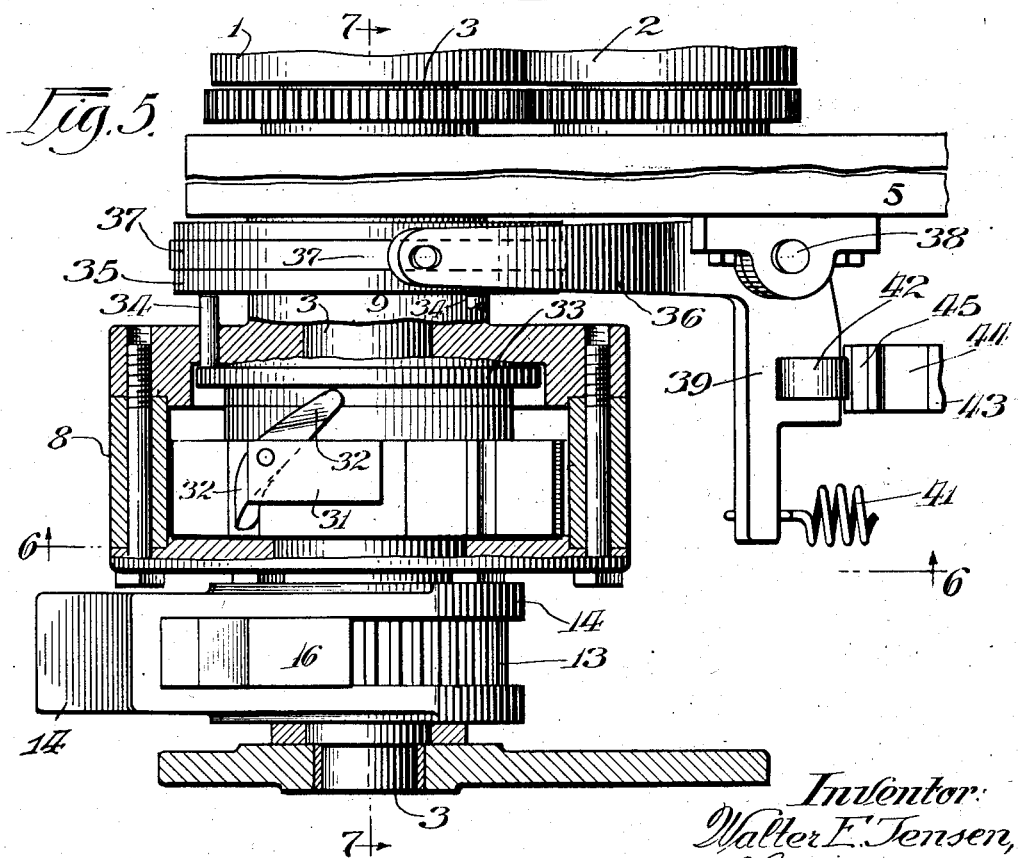

May 16, 1933.  W. E. JENSEN  1,909,831
MULTIPLE CLUTCH DRIVE
Filed Aug. 19, 1931   6 Sheets-Sheet 5
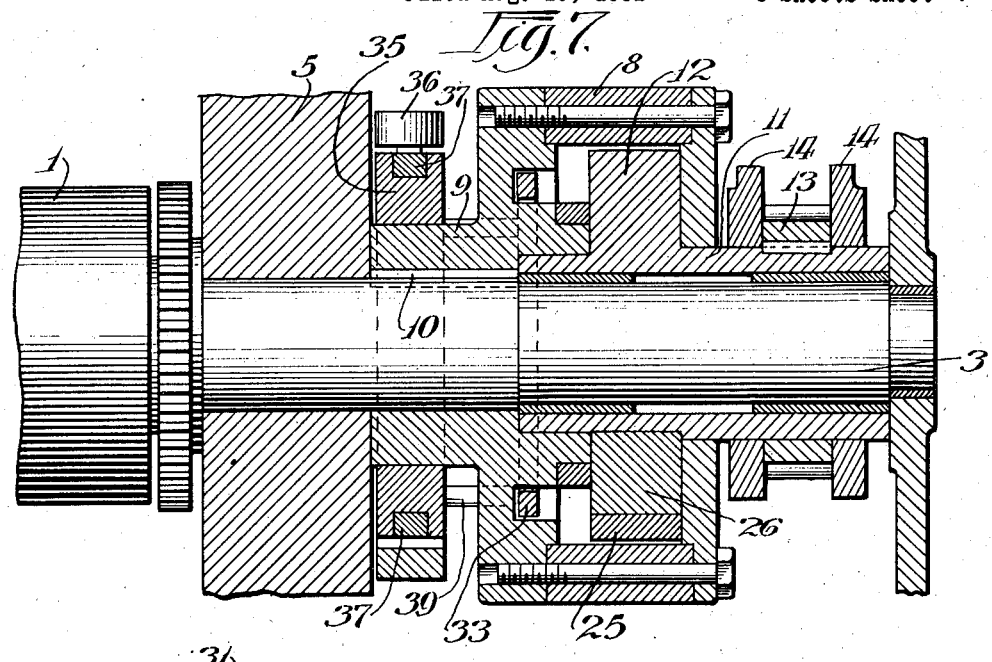
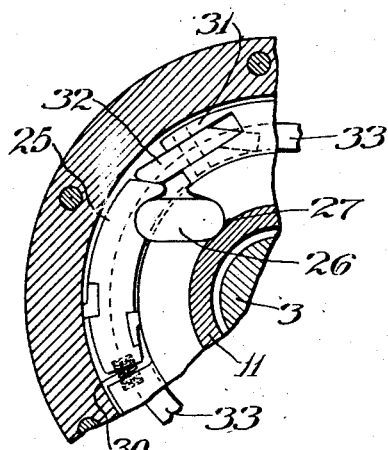
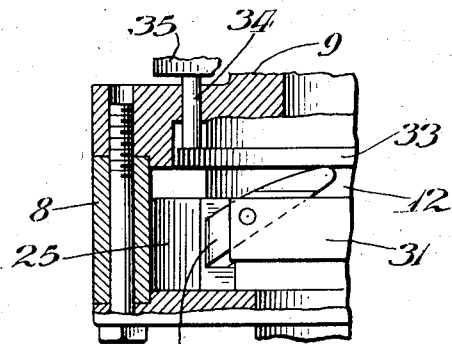
Inventor:
Walter E. Jensen,
By Wm. G. Frederwich
Attorney.

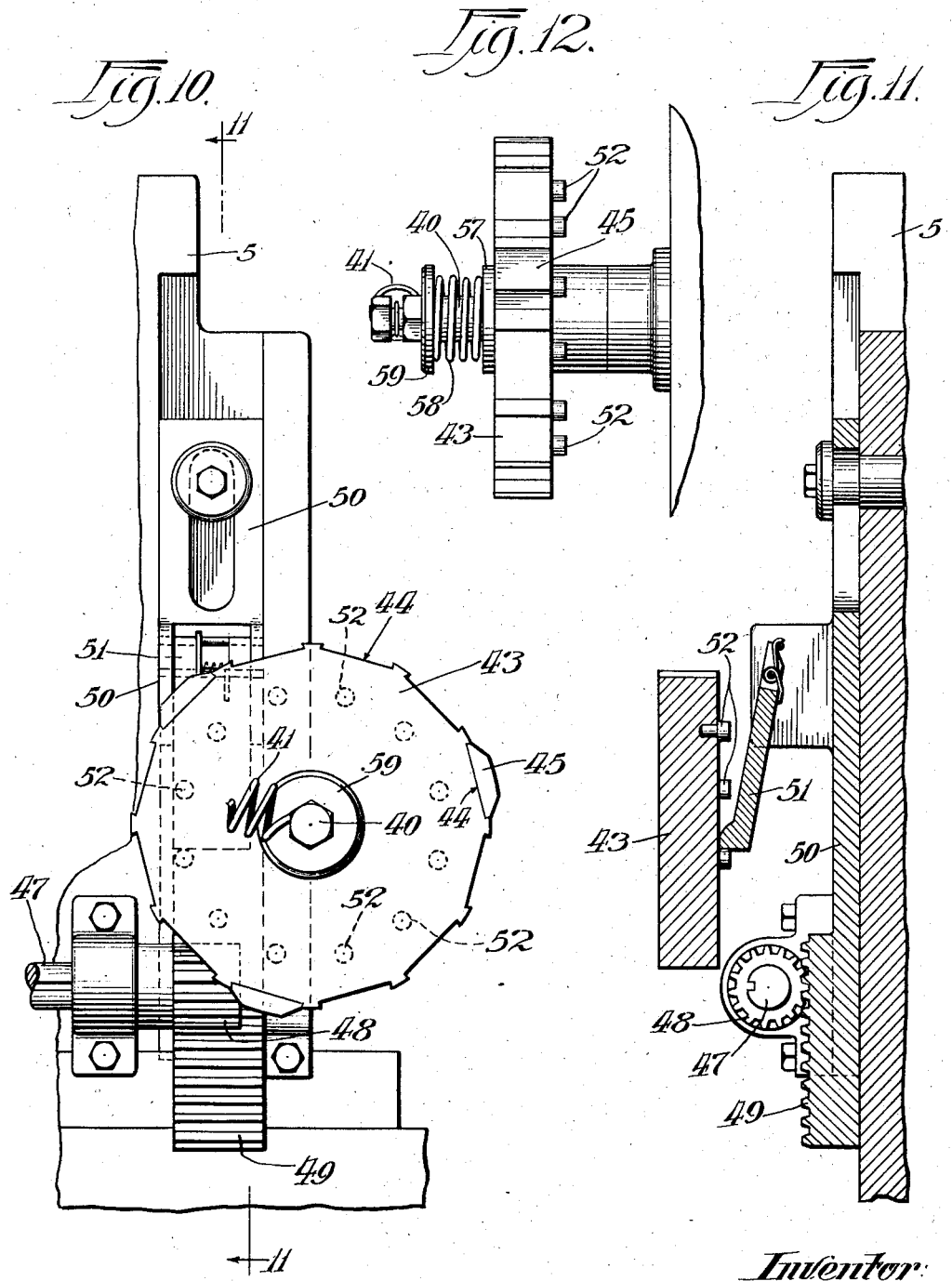

Patented May 16, 1933

1,909,831

UNITED STATES PATENT OFFICE

WALTER E. JENSEN, OF CHICAGO, ILLINOIS

MULTIPLE CLUTCH DRIVE

Application filed August 19, 1931. Serial No. 558,037.

In the manufacture of devices composed of two sets of strips of heavy paper crossing each other at right angles and interlocked with each other, the individual strips are cut from large sheets which are slit into ribbons and punched. The sheets are fed ahead step by step through distances corresponding to the widths of the cells or based on the width of the projecting ends or buffers in the completed product. In any event, since these cellular structures are made in a great variety of sizes and styles, provision must be made to feed the sheets through various cycles of steps; the steps in any given cycle being variable in size, order and number.

Viewed in its most specific aspect, the present invention may be said to have for its object to produce a simple and novel mechanism for driving a paper feed roll step by step from a constantly rotating shaft.

In carrying out my invention, I employ two separate one-way clutches which are the immediate driving means for the feed roll; the clutches being driven through reciprocable elements operating from the constantly rotating shaft; the strokes of these reciprocable elements being adjustable. Therefore, during each revolution of the driving shaft the two clutches tend to operate in unison with each other to turn the feed roll. If the strokes of both of the reciprocable driving elements are the same, the feed roll will be driven by both of the clutches; but, if the stroke of one of the reciprocable elements be greater than the stroke of the other, the clutch driven by the element of longer stroke will be the one that does the driving of the feed roll. Assuming that there is to be a definite recurrent cycle of step-by-step movements of the feed roll, the steps being of two different lengths, it will be seen that, by controlling the clutch that tends to produce the longer step, so that it will take hold only whenever a longer step is to occur in the cycle, each clutch would in effect be operating independently of the other in effecting a turning movement of the feed roll. Viewed in one of its aspects, the present invention may, therefore, be said to have for its object to produce a simple and novel multiple clutch drive for a feed roll, whereby the latter may be turned through successive cycles each composed of a series of steps some of which vary in length from the others.

While my invention is particularly applicable to machines for making cellular structures, it is not limited to this field of use and may, therefore, be said to have for its object to produce a simple and novel multiple drive between a constantly rotating member and a driven member adapted to be turned step by step, whereby one driving unit or the other is brought into play, depending upon the length of the next step through which the driven member is to be turned.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is an end elevation of a fragment of a so-called partition machine to which my improved drive has been applied; Fig. 2 is a side elevation of so much of the machine as appears in Fig. 1, looking from the right of Fig. 1; Fig. 3 is a view similar to Fig. 2, looking at the opposite side of the machine from that which appears in Fig. 2; Fig. 4 is a section, on a larger scale, on line 4—4 of Fig. 1, through one of the clutches; Fig. 5 is a top plan view, partly in section, of the right-hand part of the machine as it appears in Fig. 1, showing the mechanism appearing in Fig. 2; Fig. 6 is a view which may be said to be a section on line 6—6 of Fig. 5; Fig. 7 is a section on line 7—7 of Fig. 5; Fig. 8 is a view similar to Fig. 6, showing only a fragment of the clutch, the clutch dogs being shown in different positions in the two figures; Fig. 9 is a view similar to Fig. 5, showing only a fragment of the clutch, the parts being in the positions corresponding to those of Fig. 8; Fig. 10 is a view, on a larger scale than Fig. 2, of the indexing mechanism shown in Fig. 2; Fig. 11 is a section on line 11—11 of Fig. 10; and Fig. 12 is an edge view of the indexing disk and its immediate support.

In the drawings I have illustrated my invention as applied to the operation of feed rolls for sheets of paper in a so-called partition machine, and, for the sake of brevity, the detailed description will be confined to this particular embodiment.

Referring to the drawings, 1 and 2 represent a pair of cooperating feed rolls of which the roll 1, fixed upon a shaft 3, is the driven roll and, in turn, drives the other roll. The roll shaft 3 extends through and is journalled in suitable side frame members 4 and 5, and is adapted to be turned step by step through suitable driving connections with a main shaft 6 extending parallel with the roller shaft through and journalled in a stationary base 7 of the machine. On the ends of the shaft 3 are separate clutches adapted to be independently driven from the drive shaft. The clutches illustrated are of the one-way type, namely of the type which takes hold when operated in one direction but runs idly when turning in the other direction. One of these clutches need not be of any special type, but may be any standard clutch; the other clutch must be of a type that can be controlled during the operation of the machine, so as to operate normally at times, and at other times be kept from functioning.

In the drawings the two clutches have been shown as being substantially alike, each consisting of a cylindrical drum or casing 8 having at one end a hub 9 which is keyed to the shaft 3 by key 10. Extending inwardly through the other end of the drum or casing is a sleeve 11, loose on the shaft but having fixed thereto, within the casing, a thick disklike block 12 between which and the surrounding cylindrical wall of the casing are located the clutch dogs to be hereinafter described.

Keyed to each of the clutch sleeves 11, outside of the casing or drum, is a pinion 13 lying between the arms of a U-shaped bracket 14; the sleeve passing through the arms of the bracket near their free ends. The bracket serves to hold to the pinion a driving rack 15 which lies between the arms of the bracket. The two racks are on the upper ends of a pair of reciprocating rods which I have indicated at 16 and 17; the rod 16 being on one side of the machine and the rod 17 on the other side. The lower end of each of these two rods is engaged with a crank pin on the main shaft of the machine so that, as the main shaft revolves, the rods with their racks are reciprocated, oscillating the sleeve elements of the clutches and causing the feed roll shaft to turn step by step. The crank pins are made adjustable to permit the length of the stroke of each rack bar to be varied. In the arrangement shown, the main shaft has at the ends, outside of the frame of the machine, heavy disklike members 18, 18. On the outer vertical face of each of the members 18 are two spaced parallel guides 19 and 20 between which is adjustably fitted a block 21 carrying the actual crank pin 22 with which the lower end of the corresponding rack bar engages. The block 21 may be adjusted from and toward the long axis of the main shaft by means of any usual or suitable screw device 23.

It will be seen that, if the two clutches are alike and the throw of the two rack bars that operate the clutches is the same, the feed roll will simply be turned step by step through a double drive instead of through a single drive. However, if the stroke of one rack be longer than that of the other, and both clutches are permitted to function in their normal manner, it will only be that clutch driven by the rack of longer stroke that will be effective to turn the feed roll because it overruns the other clutch and thus prevents the latter from taking hold. I make use of this principle that the more rapidly moving clutch will be the controlling one, to make it possible for the steps in a given series of steps or angular movements of the feed roll to vary from each other in length. In other words, the parts are so adjusted that one clutch will drive the feed roll through a step of predetermined length while the other clutch will cause the roll to turn through a longer step. By properly controlling the clutches, to determine the order in which they shall be the effective means for driving the roll, any desired relation between the long and the short steps throughout a recurring series may be varied.

About the simplest way of controlling the clutches, so as to permit that one which is being driven through the smaller angle to drive the feed roll shaft without interference on the part of the other clutch, is to provide means for preventing the clutch of greater angular movement from taking hold except at such times when the feed roll is to be turned through a long step; thus permitting the other clutch, during the remainder of the time, to drive the feed roll ahead, once during each revolution of the main shaft.

The details of what may be termed the plain clutch are best shown in Fig. 4 which illustrates a well known commercial form of clutch, in which a series of shoes 25 lie between the periphery of the thick driving disk 12 and the surrounding annular wall 8 of the clutch shell. Under what may be termed the trailing end of each shoe is a short, loose rocking post 26 seated in a deep notch 27 in the driving disk 12 and at its outer end in a shallower notch 28 in the inner or under side of the shoe. The notch 27 is so shaped that the pin or post may swing in a plane at right angles to the axis of rotation of the clutch. Between the advance end of each clutch shoe and a radially projecting lug 29 on the part 12 in front of the shoe, is a compression spring 30. This spring tends constantly to force its shoe backward, namely, in the counter clockwise direction, as viewed in Fig. 4. The parts are so proportioned that the pin or post lies at an acute angle to a radius of the clutch, on that side of the radius that will cause the pin or post to swing more nearly parallel to that radius as the spring pushes the shoe back. In other words, backward movement of the shoe straightens up the pin or post and forces the trailing end of the shoe outwardly, thereby causing the shoe to be clamped between the members 12 and 8 at its front end, and clutching the members 12 and 8 together whenever the member 12 is turned in the clockwise direction, as viewed in Fig. 4, namely, in the direction further to straighten up the several pins or posts. As previously stated, the present invention is not concerned with the details of the clutch, and I have described only enough of this old type to explain the manner in which such a clutch may be controlled. Thus, it will be seen that, if the shoes in the clutch are pushed ahead so as to make the angles of the pins to corresponding radii of the clutch still greater than they were before, the shoes will simply slide around within the clutch drum or casing when the driving member 12 is turned in the clockwise direction; so that the clutch will not take hold until the shoes are freed, and are brought back to their normal positions by the springs in front of the same.

The controlled clutch is illustrated in Figs. 5-9. The only difference between this clutch and the one that I have just described is in the shape of the lugs on the central driving member 12. Instead of being simple lugs in which the adjacent ends of the springs 30 may be seated, they must serve the added purpose of supporting means to hold the shoes in their idle positions. These lugs 31, corresponding to lugs 29 in the other form, engage at one side with the springs 30 and at their other side carry dogs 32 pivoted to swing about substantially radial axes. One end of each dog is shaped to engage with the trailing end of the clutch shoe in advance thereof; the meeting faces of the dogs and shoes being fashioned to produce a wedge and cam action whenever the dogs are swung in one direction, thereby to push the shoes into their release positions. In Figs. 5 and 6, the parts are shown in the positions which they occupy while the clutch is free to function in a normal manner but, in Figs. 8 and 9, the dogs 32 are shown as having been thrown into clutch-locking positions whereby the clutch is rendered inoperative.

The springs 30 behind the shoes are strong enough to swing the dogs out of the way.

In order to operate all of the dogs simultaneously, I provide within the clutch casing a ring 33 that may be moved a limited distance lengthwise of the axis of the shaft 3 and be brought into engagement with the adjacent ends of the dogs. When the ring is pushed inwardly, the dogs are swung into their locking positions whereby the clutch is rendered inoperative for the time being. When the pressure on the ring is released, the springs behind the clutch shoes are able not only to move the shoes into their working positions but to push the dogs and the actuating ring for the dogs out of the way. A series of pins 34 extend from the ring 33 through the inner vertical wall or side of the clutch casing; these pins engaging with the side or face of a ring 35 surrounding and movable lengthwise of the hub 9 of the clutch casing. By moving this ring 35 back and forth along the hub, the clutch that we are considering may be thrown into and out of operative condition at will.

In the arrangement shown, the ring 35 is moved back and forth by means of a fork 36 that partially embraces the ring and has elements 37 entered into an annular peripheral groove in the ring to interlock the fork end and the ring while permitting the latter to turn freely. The shank of this fork is secured to the frame member 5 by a hinge connection 38. An arm 39 extends laterally from the member 36 at the hinge axis, the free end of this arm being connected to a stationary post 40 by a strong tension spring 41. This spring, when free to do so, swings the operating yoke or fork 36 in a direction to lock the clutch in a condition that will prevent it from taking hold. In order to permit the clutch to function, the fork or yoke must be swung into its idle or release position against the tension of the spring. This can conveniently be accomplished by causing the driving shaft to operate suitable actuating means at proper times. In other words, if, for example, every fifth step in the movement of the feed roll is to be a long step, the means driven by the main shaft can cause some element to free the clutch that we have just been considering from its restraining means once during each five revolutions of the main shaft; thus permitting the other clutch to turn the feed roll through four steps while the controlled clutch is utilized only during the fifth step.

Perhaps the simplest way of operating the clutch controller 36 is to provide the arm 39 with a roller 42 lying in the plane of a many-sided wheel 43 mounted on the frame of the machine in such a manner as to permit it to be turned. The periphery of the wheel is provided with seats 44 into any or all of which cam blocks 45 may be set. The parts are so proportioned that, when one of the cam blocks engages with the roller or cam roll 42 on the clutch, it holds the clutch controller in its idle position. Therefore, it is only necessary to turn this wheel from time to time.

The controlling, or what may be termed the indexing wheel is shown as being driven in very much the same way as the indexing wheel in my prior application, Serial Number 531,430, but I shall briefly describe this mechanism.

As shown in Figs. 1 and 2, there is a shaft 47 extending lengthwise of the machine above the base and just inwardly from the indexing wheel 43. The shaft has fixed thereon a pinion 48, which, as best shown in Figs. 10 and 11, meshes with rack teeth 49 on a vertical slide 50 mounted in the outer side of the frame member 5. The slide 50 carries a pawl 51 adapted to engage with pins 52 projecting from the inner side of the indexing wheel. The parts are so proportioned that, when the slide moves up, the pawl simply rises with it and, when the slide moves down, the pawl strikes one of the pins 52 and causes the indexing wheel to turn through the distance between consecutive pins, during the remainder of the downward stroke of the slide.

The shaft 47 is operated in definite time relation to the rotation of the main shaft. On the main shaft is an eccentric 53 with which cooperates an eccentric strap and rod 54. The eccentric rod is pivoted to the lower end of a vertically slidable rack bar 55 meshing with a pinion 56 on the shaft 47. Therefore, as the main shaft revolves, the shaft 47 is caused to oscillate and thus in turn causes the pawl-carrying slide to reciprocate and turn the indexing wheel. In short, the indexing wheel is turned through a step for each revolution of the main shaft, and therefore, for each working stroke of the drive mechanisms for the feed roll. Therefore, it is only necessary to place cam blocks in some of the seats on the indexing wheel, and leave the other seats empty, in order to permit the controlled clutch to be kept idle during any given number of strokes within the limits of the number of faces on the indexing wheel, and then come into play to feed through one or more steps of greater length; the other clutch doing the driving whenever the controlled clutch is being kept out of action. A complete cycle of steps need not, of course, consist of a series of steps of one length followed by one or more steps of another length, but in the same cycle there may be one or more long steps, then one or more short steps, and then, again, one or more long steps, and so on. Furthermore, if desired, all of the steps in a cycle may be of the same length just as though a single clutch were being employed.

The indexing wheel may yieldingly be held in any angular position in any suitable manner. In the arrangement shown, the wheel is rotatable on the post 40. Surrounding the post is a friction shoe 57 pressed against the side of the wheel by a spring 58 one end of which engages the shoe while the other end abuts against a collar or washer 59 on the post.

In order to prevent the driven shaft from overrunning when the clutches let go after a working stroke, I have provided a brake that will place on the shaft a slight restraint against turning movements. As shown in Figs. 1, 3 and 4, this brake consists simply of two almost semi-cylindrical shoes 60 and 61 hinged together at corresponding ends and supported from the frame member 4 by a pin 62; and joined together at their other ends by a bolt 63 under the nut of which is placed a spring 64. These shoes surround the drum or casing of one of the clutches, which drum or casing, as heretofore explained, is keyed to the driven shaft.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. A rotary driving member, a rotary driven member, two separate drives between said members each including a clutch adapted to turn the driven member step by step as the driving member revolves, and means periodically to render one of said clutches inoperative to turn the driven member during one or more complete revolutions of said driving member.

2. A rotary driving member, a rotary driven member, two separate drives between said members each including a clutch adapted to turn the driven member step by step as the driving member revolves, and means periodically to hold one of the clutches in a release position while the corresponding drive is operating in a driving direction.

3. A rotary driving member, a rotary driven member, two separate drives between said members each including a one-way clutch and a reciprocatory element for oscillating the driving element of the clutch, and means periodically to prevent one of said clutches from taking hold during a driving stroke of the corresponding reciprocatory element.

4. A rotary driving member, a rotary driven member, two separate drives between said members each including a one-way clutch and a reciprocatory element for oscillating the driving element of the clutch, one of said reciprocatory elements having a longer stroke than the other to produce a greater angular movement of the driven member, and means periodically to prevent the clutch corresponding to the reciprocatory element of longer stroke from taking hold during a driving stroke of that element.

5. A rotary driving member, a rotary driven member, two separate drives between said members each including a clutch adapted to turn the driven member step by step as the driving member revolves, and means controlled by the driving member to render one of said clutches inoperative to turn the driven member during one or more complete revolutions of said driving member.

6. A rotary driving member, a rotary driven member, two separate drives between said members each including a clutch adapted to turn the driven member step by step as the driving member revolves, and means controlled by the driving member to hold one of the clutches in a release position while the corresponding drive is operating in a driving direction.

7. A rotary driving member, a rotary driven member, two separate drives between said members each including a one-way clutch and a reciprocatory element for oscillating the driving element of the clutch, and means actuated by the driving member periodically to prevent one of said clutches from taking hold during a driving stroke of the corresponding reciprocatory element.

8. A rotary driving member, a rotary driven member, two separate drives between said members each including a one-way clutch and a reciprocatory element for oscillating the driving element of the clutch, one of said reciprocatory elements having a longer stroke than the other to produce a greater angular movement of the driven member, and means actuated by the driving member periodically to prevent the clutch corresponding to the reciprocatory element of longer stroke from taking hold during a driving stroke of that element.

9. A rotary driving member, a rotary driven member, two separate drives between said members each including a one-way clutch, an adjustable indexing device actuated by the driving member, and means controlled by said indexing device to prevent one of said clutches from taking hold.

10. A rotary driving member, a rotary driven member, two separate drives between said members each including a one-way clutch, means including an actuator to lock one of the clutches against taking hold, an adjustable indexing wheel provided with means to engage and shift said actuator from time to time as the wheel revolves, and means to revolve said wheel in definite relation to the rotation of and at a lower angular speed than the driving member.

11. In combination, a driving member, a driven member, a constant drive between said members, a controlled drive between said members having a greater motion than said constant drive and operating in unison therewith, each of said drives including means for operating the driven member in a step by step manner, and means for rendering said controlled drive inoperative during operation of said constant drive.

12. In combination, a driving member, a driven member, a constant drive between said members, a controlled drive between said members having a greater operative motion than said constant drive and operating in unison therewith, said drives being operative to actuate said driven member in a step by step manner, and automatic means for rendering said controlled drive inoperative at predetermined intervals.

13. In combination, a driving member, a driven member, a constant drive between said members, a controlled drive between said members having a greater operative motion than said constant drive and operating in unison therewith, said drives being operative to impart step by step motion to said driven member, means for stopping said driven member between steps, and means for rendering said controlled drive inoperative during operation of said constant drive.

14. In combination, a driving member, a driven member, a constant drive between said members, a controlled drive between said members having a greater operative motion than said constant drive and operating in unison therewith, said drives being operable to impart step by step motion to said driven member, and an index wheel for affecting the operability of said controlled drive through a cycle of operations in which said controlled drive is rendered inoperative at predetermined intervals.

15. In combination, a member to be driven, a constant drive and an occasional drive each including means to move the driven member step by step, the steps through which said member is moved when both drives act being longer than when said member is being driven by the constant drive alone, a driving member for said drives, and means controlled by said driving member to cause the occasional drive to remain inactive at intervals that may be varied at will.

In testimony whereof, I sign this specification.

WALTER E. JENSEN.